United States Patent [19]

Kamaya

[11] 3,900,172

[45] Aug. 19, 1975

[54] TAPE CASSETTE

[75] Inventor: Naoki Kamaya, Tokyo, Japan

[73] Assignee: Sony Corporation, Tokyo, Japan

[22] Filed: Jan. 31, 1974

[21] Appl. No.: 438,447

[30] Foreign Application Priority Data

Feb. 1, 1973 Japan .............................. 48-14227

Sept. 25, 1973 Japan .............................. 48-111572

[52] U.S. Cl. .............................................. 242/198

[51] Int. Cl... G03b 1/04; G11b 15/32; G11b 23/04

[58] Field of Search ............................ 242/197–200, 242/192, 194; 352/72–78; 360/93–96

[56] References Cited

UNITED STATES PATENTS

| | | | |
|---|---|---|---|
| 2,941,741 | 6/1960 | Bilsback | 242/198 |
| 3,008,012 | 11/1961 | Proctor | 242/198 X |
| 3,672,603 | 6/1972 | Swain | 242/194 |

*Primary Examiner*—Leonard D. Christian
*Attorney, Agent, or Firm*—Lewis H. Eslinger; Alvin Sinderbrand

[57] ABSTRACT

A tape cassette for a magnetic recording and/or reproducing apparatus has at least one reel contained in a housing formed with an opening through which a tape wound on the reel can be withdrawn from the cassette housing for the recording of signals thereon or reproducing the signals therefrom, by one or more rotary magnetic heads, and a lid is provided to normally close the housing opening when the cassette is not in use and thereby to protect the tape from damage. The cassette is provided with a brake member which is responsive to the position of the lid thereby to prevent rotation of the reel when the lid closes the opening and to permit free rotation of the reel when the opening is exposed for use in the recording and/or reproducing apparatus.

7 Claims, 18 Drawing Figures

TAPE CASSETTE

BACKGROUND OF THE INVENTION

1. Field of the Invention

This invention relates generally to tape cassettes and more particularly is directed to improvements in tape cassettes for preventing the rotation of the reel or reels contained in the cassette housing when the cassette is not in use.

2. Description of the Prior Art

A number of cassette structures have been previously proposed for use with a magnetic tape. In such existing tape cassettes, one or more reels are normally mounted for free rotation within the cassette housing, so that the tape can be conveniently wound thereon during the operation of a tape player. However, when the tape cassette is removed from the player, the free rotatable reel within the tape cassette poses problems since rotation of the reel will cause inadvertent unwinding of the tape from the reel. The unwound tape can become damaged or tangled within the tape cassette or discharged from the tape cassette where it is subject to damage by tearing or the like.

A tape cassette to avoid the above disadvantage is disclosed in the U.S. Pat. No. 3,027,111 issued Mar. 27, 1962. In such tape cassette, a brake lever provided in the tape cassette has to be directly biased or actuated from the outside of the tape cassette to release the associated brake which otherwise prevents rotation of the reel or reels. Accordingly, it is necessary that the direction in which the tape cassette is loaded or inserted in the cassette holder of the tape player coincide with the direction in which the brake lever has to be biased or moved for release of the brake, so that there is a limitation in the use of the tape cassette.

Further, in the case where the cassette has a lid in addition to a reel brake, as aforesaid, it is necessary to provide device for operating the lid and the brake lever on the cassette holder, which results in complication of the construction of the latter.

It is also required that, when the tape cassette is loaded on the holder, the lid of cassette is opened correctly and the brake is completely released, so that it is difficult to positionally adjust the device or devices for effecting such operations.

Further, since the brake lever always protrudes from the cassette housing, the brake lever may be actuated inadvertently during handling of the cassette.

SUMMARY OF THE INVENTION

Accordingly, an object of this invention is to provide a tape cassette free from the above mentioned disadvantages.

Another object of the invention is to provide a tape cassette in which, when the tape cassette is not used, an opening of the tape cassette is closed by a lid and each reel in the tape cassette is held against rotation in response to closing of the lid.

The above, and other objects, features and advantages of this invention, will be apparent from the following detailed description of illustrated embodiments which are to be read in connection with the accompanying drawings.

BRIEF DESCRIPTION OF THE DRAWINGS

FIG. 17 is an enlarged sectional view taken along the line A—A on FIG. 13, but with the lid of the cassette housing being removed.

DESCRIPTION OF THE PREFERRED EMBODIMENTS

Figure 1:
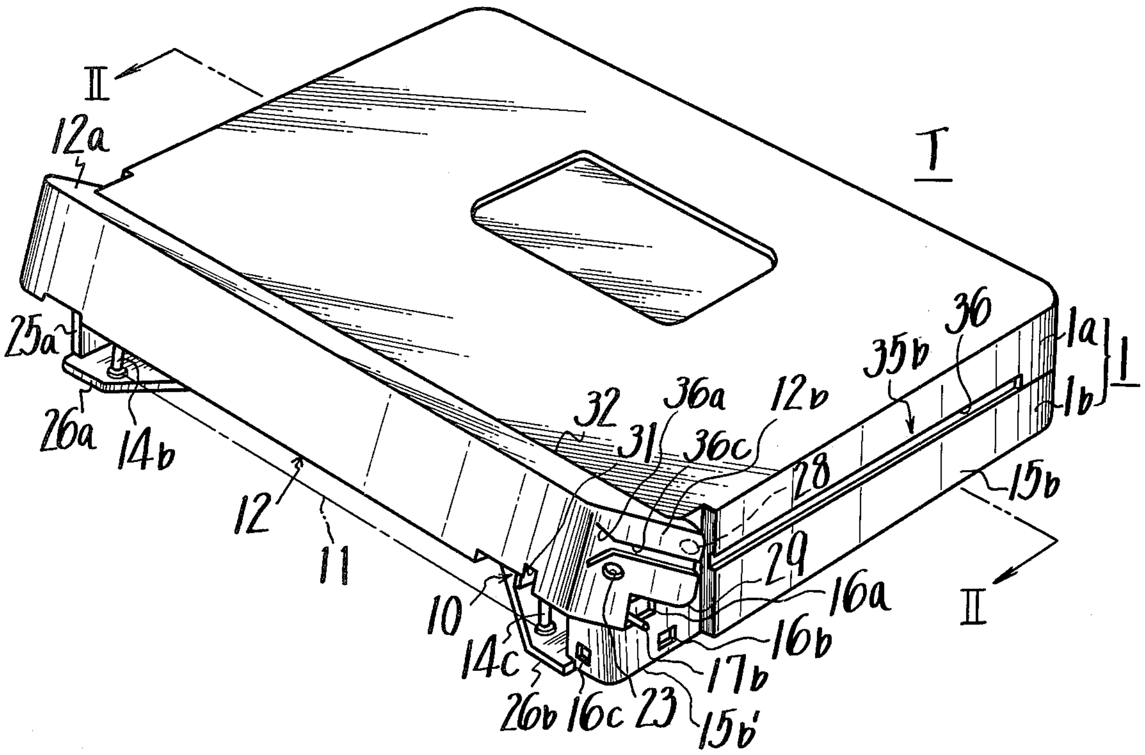
FIG. 1 is a perspective view of a tape cassette of a type to which this invention may be applied and which is shown with its lid partially opened.

Referring to the drawings in detail, and initially to FIGS. 1–5 thereof, it will be seen that a tape cassette T to which this invention may be applied generally comprises a substantially rectangular cassette housing 1 formed of mating molded plastic upper and lower sections 1*a* and 1*b* which are suitably secured together and which are respectively constituted by top and bottom walls having side or peripheral wall-defining flanges extending along one of the relatively long sides and both relatively short sides of the rectangular housing 1. Thus, the other relatively long side of cassette housing 1 is open or without a side wall and cooperates with a contiguous trapezoidal cutout in the bottom wall to define a recess or opening 10 through which tape 11 contained within the cassette housing can be extracted or withdrawn from the cassette housing. The tape cassette T further comprises a lid 12 which is pivoted on cassette housing 1 and which is adapted, in a closed position, to close or cover the open relatively long side of cassette housing 1.

Figure 2:
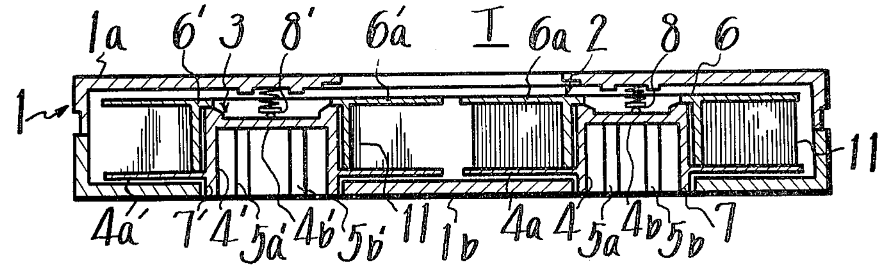
FIG. 2 is a sectional view taken along the line II-II on FIG. 1.
Figure 3:
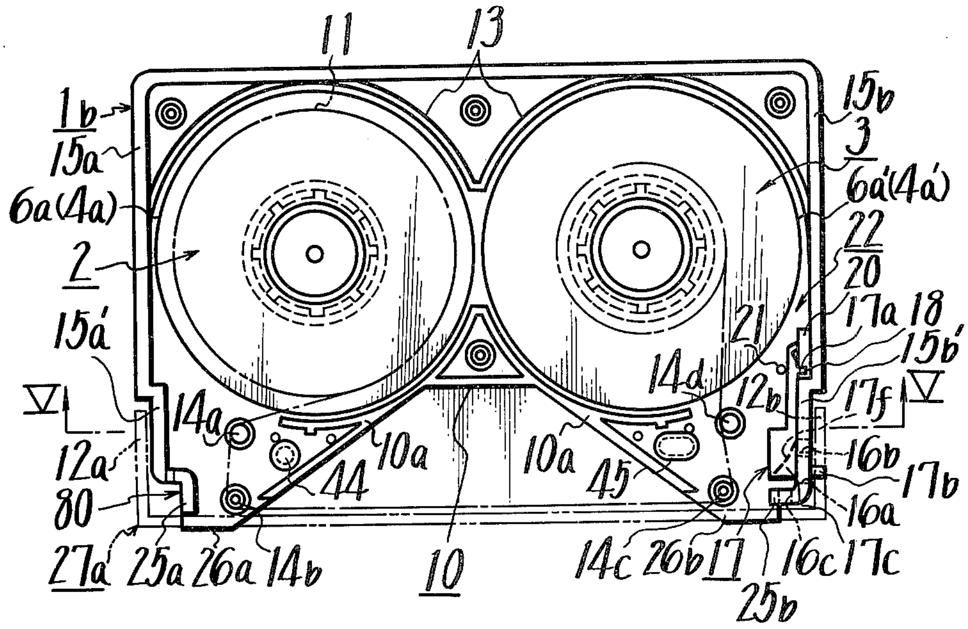
FIG. 3 is a top plan view of the tape cassette of FIG. 1, but with the top wall of the cassette housing being removed.

As shown particularly on FIGS. 2 and 3, the supply of tape 11 contained in cassette housing 1 is wound on supply and take-up reels 2 and 3. The supply reel 2 is shown to include a cylindrical hub 4 which, at its lower end, is loosely and rotatably guided in a circular hole 7 provided in the bottom wall of cassette housing 1. A lower flange 4*a* extends radially outward from hub 4 above the bottom wall of cassette housing 1 and the upper end of cylindrical hub 4 has an end wall 4*b* extending thereacross. The inner surface of hub 4 is formed with axial projections or splines 5*a*, 5*b* spaced apart around the hub, for example, with an angular spacing of 60° between adjacent aplines, for rotatable coupling of supply reel 2 with a respective reel drive shaft or spindle, as hereinafter described. The supply reel 2 is completed by an outer cylindrical hub 6 which extends downwardly over hub 4 and may be secured to the latter by a suitable adhesive or binder therebetween, and an upper flange 6*a* extending radially outward from hub 6 to define an annular space between flanges 4a and 6a in which tape 11 may be wound about the secured-together hubs 4 and 6. A spring 8 is interposed between the top wall of housing 1 and end wall 4*b* of hub 4 for urging supply reel 2 downwardly against the bottom wall of cassette housing 1. Thus, when the reel 2 is coupled to a reel drive shaft projected upwardly into the socket defined within hub 4, the reel 2 is urged from floating upwardly. As a result, the reel 2 is correctly engaged with the reel drive shaft. As shown, the take-up reel 3 may be identical in construction to the supply reel 2 and its several parts are identified by the same reference numerals but with primes appended thereto.

As shown particularly on FIG. 3, a flange may extend upwardly from the bottom wall of housing 1 along the margin of the cutout in such bottom wall and cooperate with a mating flange depending from the top wall of the cassette housing to define a wall or partition 10*a* which prevents access to the reels 2 and 3 through the opening or recess 10. Arcuate partitions 13 are similarly provided within housing 1 adjacent the peripheries of the flanges of reels 2 and 3 for preventing the removal from the reels of the turns of tape 11 wound thereon in the event that such turns become loosened. The arcuate walls 13 and the peripheral walls of cassette housing 1 form stiffener walls of approximately triangular shape to enhance the rigidity of housing 1. Guide pins 14*a* and 14*b* and guide pins 14*c* and 14*d* extend upwardly from the bottom wall of cassette housing 1 at opposite sides of the cutout 10 in such bottom wall for guiding the tape 11 between reels 2 and 3 in a path having a run that extends along the open, relatively long side of housing 1.

Figures 12, 14:
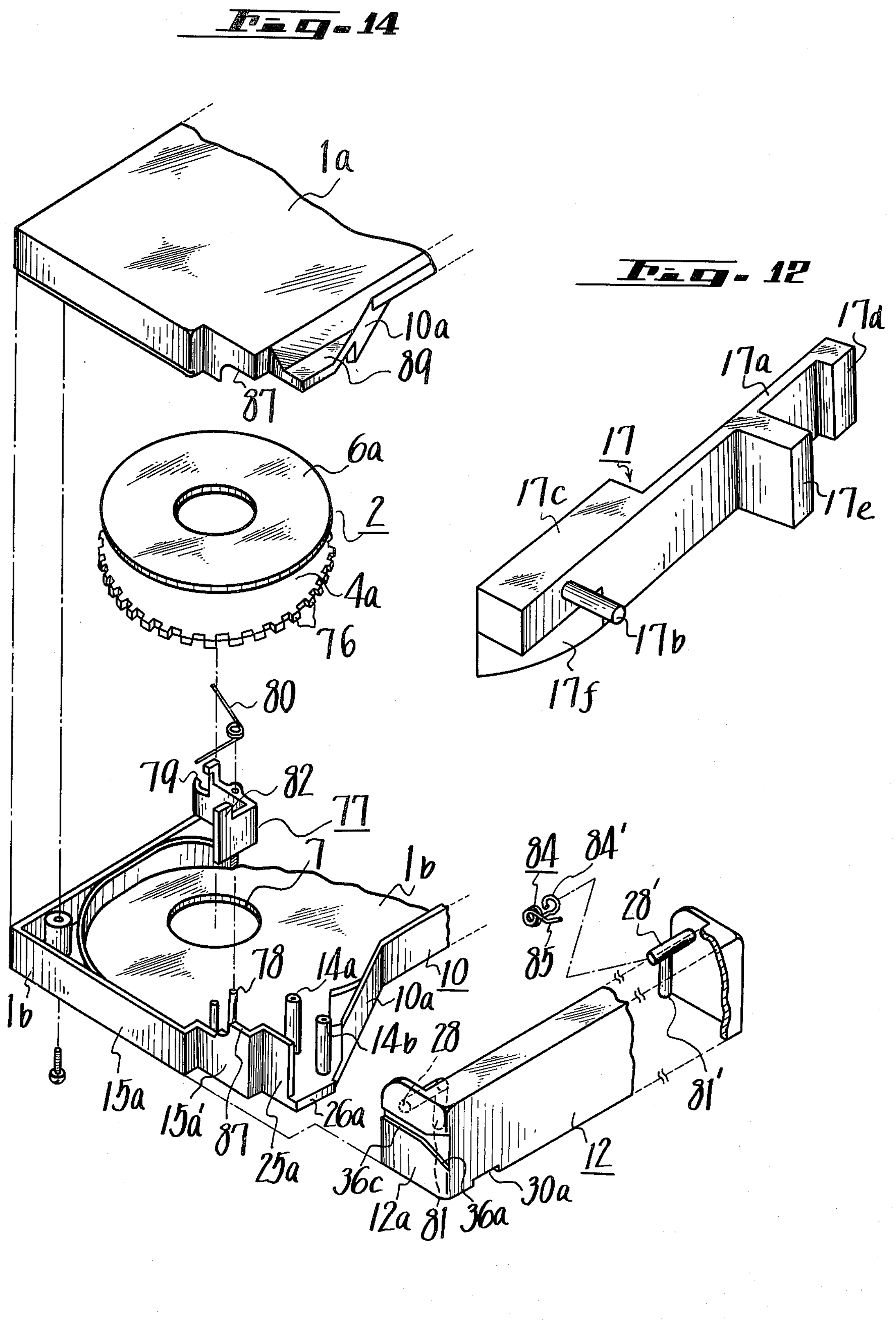
FIG. 12 is an enlarged perspective view of a latching element included in the tape cassette according to this invention.
FIG. 14 is a fragmentary exploded perspective view of several components or parts of the tape cassette shown in FIG. 13.

The side or peripheral walls 15*a* and 15*b* of housing 1 which extend along the opposite relatively short sides of the rectangular cassette housing are shown to be formed with inwardly offset end portions 15*a'* and 15*b'* adjacent the open relatively long side of the cassette housing (FIG. 3). The lid 12 is shown to include a front portion 27 (FIG. 9) depending from an edge of an elongated top portion 32 (FIG. 1) and ears 12*a* and 12*b* directed rearwardly from the opposite ends of front portion 27 to fit into the recesses defined outside of end portions 15*a'* and 15*b'* of side walls 15*a* and 15*b* and thus lie flush with the outer surfaces of such side walls, as shown particularly on FIGS. 4 and 8. The offset end portion 15*b'* of side wall 15*b* has two spaced apart apertures 16*a* and 16*b* (FIG. 1) extending therethrough, and a latching element 17 (FIGS. 3 and 12), for example, of a resilient plastic, is disposed at the inside of end wall portion 15*b'*. The latching element 17 is shown to include a relatively thin mounting portion 17*a* of generally F-shaped configuration, as viewed from above and a latching pin or projection 17*b* which extends outwardly through aperture 16*a* from a relatively thick end portion 17*c* of the latching element (FIG. 12). A groove 18 is defined between the step formed by inwardly offset end portion 15*b'* and an adjacent inward projection 20, and a gap 22 is defined between such projection 20 and an adjacent abutment 21 extending upwardly from the bottom wall of housing 1 (FIG. 3). The F-shaped mounting portion 17*a* of latching element 17 is received in the gap 22, and abutment 21 urges the end flange 17d of F-shaped mounting portion 17*a* against projection 20 while the other flange 17*e* of such mounting portion is urged into recess 18. Thus, the relatively thick end portion 17*c* of latching element 17 is normally resiliently held against end portion 15*b'* of side wall 15*b* to extend the latching pin or projection 17*b* through aperture 16a beyond the outer surface of end portion 15*b'*. However, as hereinafter described, a latch releasing element can be extended inwardly through aperture 16*b* to act against end portion 17*c* of the latching element for urging the same away from the adjacent wall end portion 15*b'*, and thereby retract the locking projection 17*b* into aperture 16*a*. Wall end portion 15*b'* has an inwardly directed end 25*b* (FIG. 3) which extends in front of the thick end portion 17*c* of the latching element and which is formed with an aperture 16*c* (FIGS. 1 and 3) that is aligned with an oblique or beveled end surface 17*f* provided at the bottom part of thick end portion 17*c* (FIG. 12). Thus, a latch releasing element can be extended through aperture 16*c* to act against oblique or beveled end surface 17*f* as an alternative means for displacing the thick end portion 17*c* of the latching element away from the adjacent wall end portion 15*b'*, as hereinafter described in detail.

Figure 9:
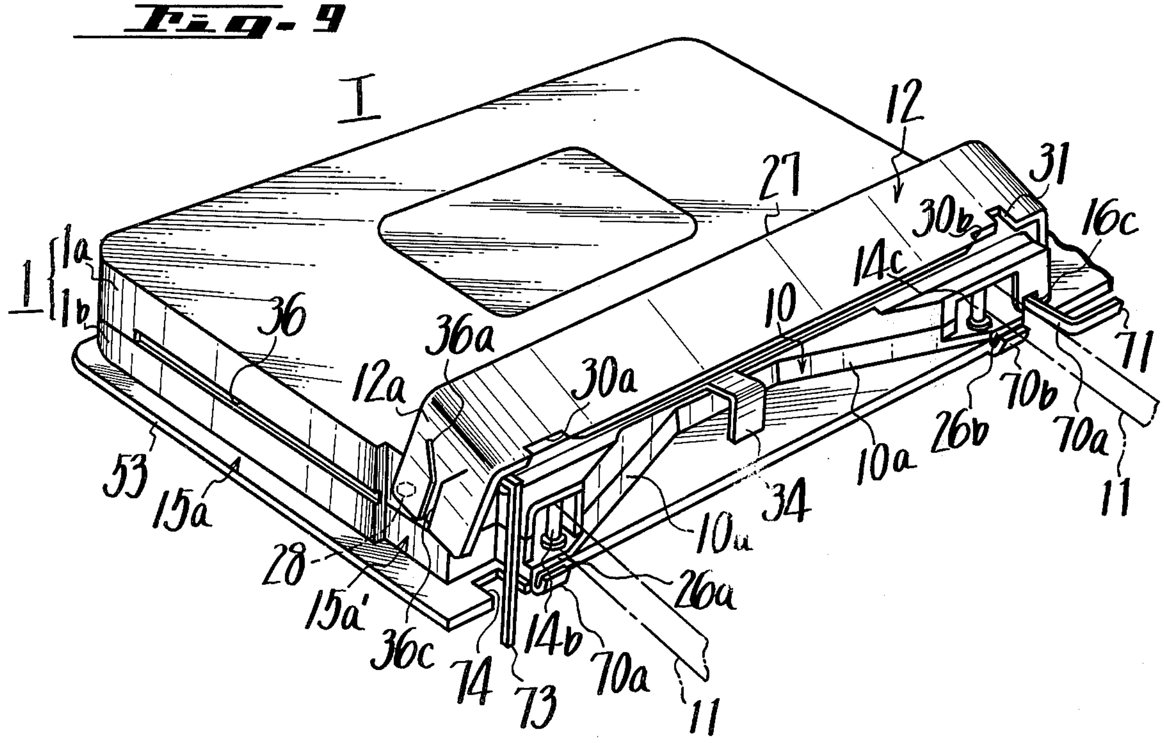
FIG. 9 is a perspective view similar to that of FIG. 8, but showing the tape cassette in the condition thereof when located in its operative position by means of the associated holder.

The ears 12*a* and 12*b* at the opposite ends of lid 12 are formed with inwardly directed pins 28 engageable in respective apertures or recesses in wall end portions 15*a'* and 15*b'* so as to mount lid 12 pivotally on cassette housing 1 for movement between a closed position (FIG. 8) and an opened position (FIG. 9). The ear 12b of lid 12 which is adjacent wall end portion 15*b'* is formed with an aperture 23 (FIG. 1) which, in the closed position of the lid, is adapted to receive the latching pin or projection 17*b* for locking the lid in its closed position. However, when the thick end portion 17*c* of latching element 17 is displaced away from the adjacent wall end portion 15*b*′, as described above, latching pin or projection 17*b* is withdrawn from aperture 23 and thereby releases the lid for movement to its opened position, as hereinafter described, from its normal closed position. The wall end portion 15*a*′ is shown to have an inwardly directed, right-angled end 25*a* for defininng a recess 80 in the respective corner of cassette housing 1 (FIG. 3) for a purpose hereinafter described in detail.

The side edge of the bottom wall of cassette housing 1 at opposite ends of the cutout portion of such bottom wall may define locating elements 26*a* and 26*b* which project beyond ends 25*a* and 25*b* of wall portions 15*a*′ and 15*b*′ (FIG. 3) so that, in the closed position of lid 12 (FIGS. 4 and 8), such locating elements 26*a* and 26*b* extend through respective notches or cutouts 30*a* and 30*b* formed in the lower edge of front portion 27 of the lid and are substantially flush with the outer surface of front portion 27. The cutouts 30*a* and 30*b* are shown to be substantially filled by locating elements 26*a* and 26*b* in the closed position of the lid. The lid 12 is further formed with recesses or cutouts 29 and 31 (FIG. 1) in the ear 12*b* and in the front portion 27 so that, in the closed position of lid 12, cutouts 29 and 31 will be substantially aligned with the previously mentioned apertures 16*b* and 16*c*, respectively, for permitting access to such apertures for the purpose described above.

Figure 4:
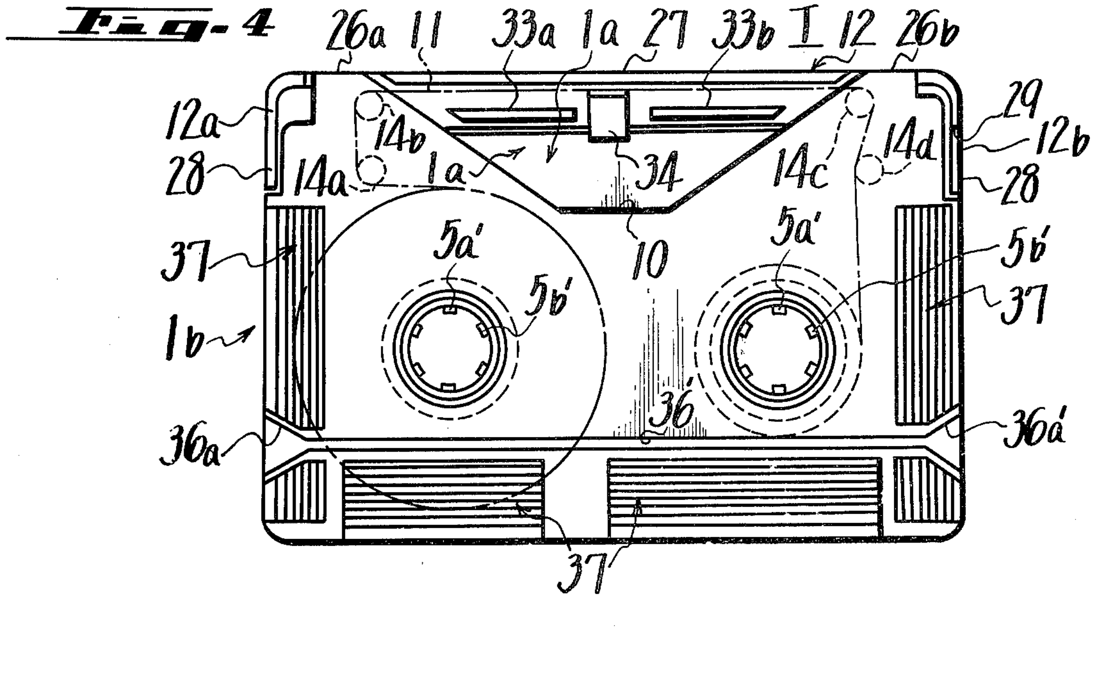
FIG. 4 is a bottom plan view of the tape cassette.
Figure 5:
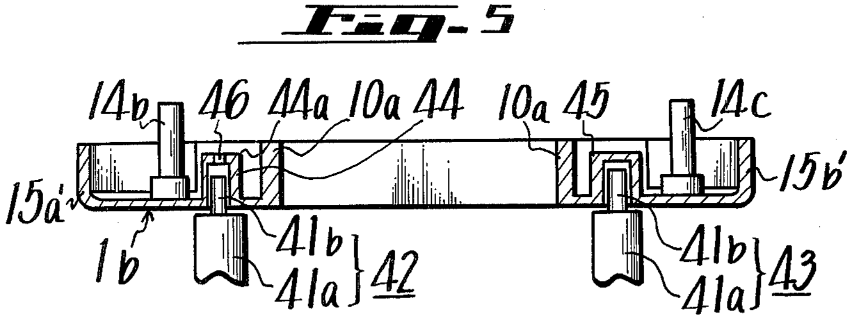
FIG. 5 is a sectional view taken along the line V—V on FIG. 3.

It will be apparent that, when lid 12 is in its closed position, the run of tape 11 extending along opening 10 between guide pins 14*b* and 14*c* is shielded or protected, at the outside, by front portion 27 of the lid and, from above, by top portion 32 of the lid. The lid 12 of tape cassette T may further have partitions 33*a* and 33*b* (FIG. 4) depending from top portion 32, which partitions extend parallel to, and are spaced from, front portion 27 of the lid so as to define a channel therebetween in which the run of the tape between guide pins 14*b* and 14*c* is accommodated when lid 12 is in its closed position. The partitions 33*a* and 33*b* have a depth at least equal to the width of tape 11 so that, with the lid in its closed position, partitions 33*a* and 33*b* substantially prevent contact with the tape run through the cutout portion of the bottom wall of cassette housing 1. Further, a substantially L-shaped tape locating member 34 may extend outwardly and downwardly from the top wall of cassette housing 1 (FIG. 9) so as to be located in the gap between partitions 33*a* and 33*b* in the closed position of lid 12 (FIG. 4). The tape locating member 34 ensures that, even if the tape between reels 2 and 3 becomes substantially loosened, the run of the tape extending between guide pins 14*b* and 14*c* will be properly positioned in respect to a tape engaging pin or member of a tape loading device by which the tape is to be withdrawn from the cassette housing.

Figure 10:
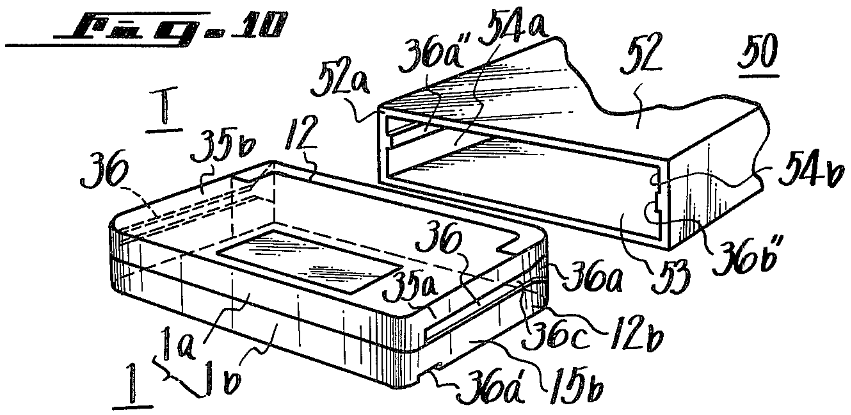
Figure 11:
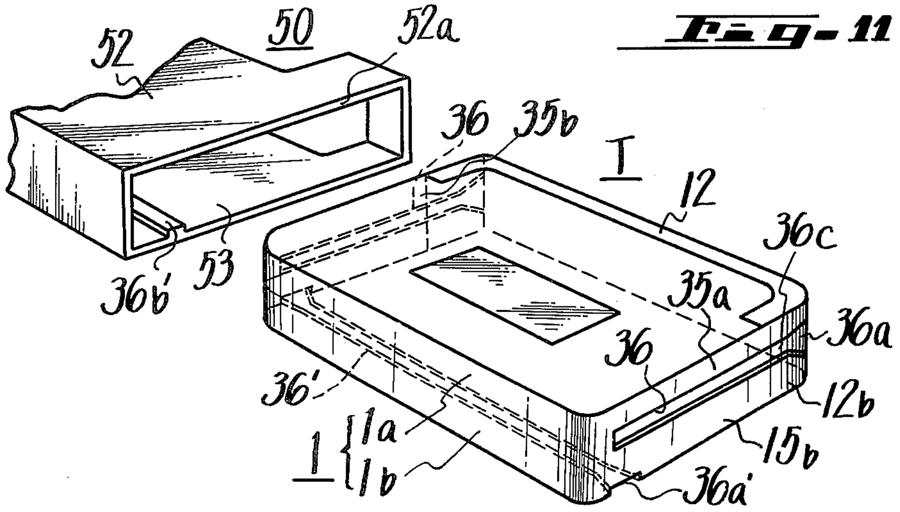

In order to guide the cassette T during its insertion into the holder of a cassette loading mechanism, as hereinafter described, the cassette T is provided with guiding means extending at right angles to each other, that is, perpendicular to the open relatively long side of cassette housing 1 and parallel to such long side, respectively. Such guiding means are constituted by grooves 36 (FIGS. 1, 9, 10 and 11) formed in the outer surfaces 35*a* and 35*b* of the relatively short side walls 15a and 15b and aligned with groove extensions 36*c* in the adjacent ears 12*a* and 12*b* of lid 12 when the latter is in its closed position. The groove extensions 36*c* have diverging open ends 36*a* by which respective guiding ridges 36*a*″ and 36*b*″ of a cassette holder 50 are led into grooves 36 when cassette T is inserted into such holder 50 in the direction perpendicular to the open relatively long side of the cassette housing (FIG. 10). Further, the undersurface of the bottom wall of cassette housing 1 is formed with a guiding groove 36′ (FIG. 4) extending parallel to the long open side of the cassette housing, and having enlarged or diverging open ends 36*a*′ so that, when tape cassette T is inserted into a holder 50 in the direction parallel to the relatively long open side of the cassette housing, as in FIG. 11, one or the other of the diverging or enlarged ends 36*a*′ of groove 36′will initiate or facilitate the entry of a guiding ridge 36*b*′ of holder 50 into groove 36′. Thus, it will be seen that tape cassette T according to this invention can be used in various types of magnetic tape recording and/or reproducing apparatus having holders which are adapted to receive the tape cassette in different directions. The grooves 36 and 36′ are preferably asymmetrically located relative to the surfaces of the cassette housing in which they are formed. Thus, the grooves 36 in side wall surfaces 35*a* and 35*b* are located closer to the top than to the bottom of the cassette housing, while the groove 36′ in the bottom wall surface of the cassette housing is located closer to one relatively long side of the cassette housing than to the other relatively long side thereof. By reason of such asymmetrical positioning of grooves 36 and 36′ and of the respective guiding ridges in the holders 50, the cassette T is insertable in each holder 50 in only a single proper orientation relative to the latter.

Figure 11:
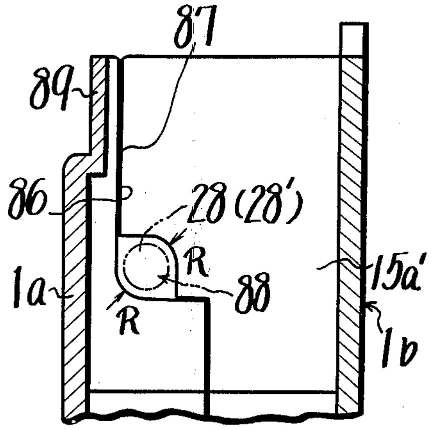
FIGS. 10 and 11 are schematic perspective views illustrating the manner in which the tape cassette according to this invention may be inserted into a holder in two different right-angularly related directions.

As shown on FIG. 4, the bottom surface of cassette housing 1 may be formed with longitudinally grooved surface portions 37 extending along the opposite relatively short sides of the cassette housing and along the closed relatively long side of the housing so that the cassette housing can be conveniently gripped at the resulting roughened surface portions when inserting the tape cassette into a holder in either of the directions illustrated on FIGS. 10 and 11.

Figure 6:
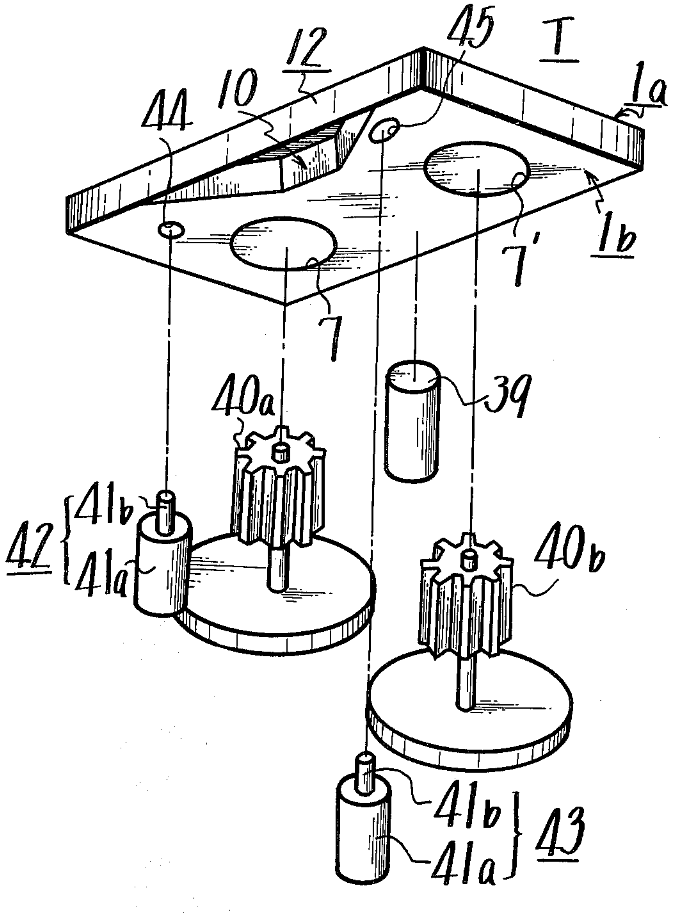
FIG. 6 is an exploded perspective view illustrating the manner in which the tape cassette of FIG. 1 is engageable with driving and locating elements of a typical magnetic tape recording and/or reproducing apparatus.

In order to accurately locate the tape cassette T in its operative position on a magnetic tape recording and/or reproducing apparatus, the latter is provided with a pair of locating pins 42 and 43 (FIGS. 5 and 6) projecting upwardly from a suitable baseplate or chassis 57 (FIG. 7) and each having a relatively large diameter base portion 41*a* and a relatively small diameter end portion 41*b* extending upwardly from the base portion 41*a* to define a shoulder at the top of the latter. An additional locating pin 39 (FIG. 6) extends upwardly from the baseplate or chassis 57 and has its upper end surface at the same level as the shoulders provided at the top of base portions 41*a* of locating pins 42 and 43. The locating pins 42 and 43 are disposed so that, when tape cassette T is in its proper operative position, the small diameter end portions 41*b* of locating pins 42 and 43 are respectively engaged in sockets 44 and 45, respectively, which are formed in the lower section 1*b* of housing 1 and open downwardly at the bottom wall surface of the latter. The socket 44 is diametrically dimensioned to closely receive end portion 41*b* of locating pin 42, while the other socket 45 is laterally elongated, that is, elongated in the direction parallel to a line connecting the edge surfaces of locating elements 26*a* and 26*b*. Thus, even if there is some variation in the distance between the centers of locating pins 42 and 43, no difficulty will be experienced in obtaining the engagement of the end portions 41*b* of pins 42 and 43 with the respective sockets 44 and 45 when the tape cassette is properly located by means of its locating elements 26*a* and 26*b*, as hereinafter described. It will be noted that the sockets 44 and 45 are disposed adjacent the open relatively long side of the cassette housing 1, and the locating pin 39 is positioned relative to locating pins 42 and 43 so that, when sockets 44 and 45 receive end portions 41*b* of locating pins 42 and 43, the bottom surface of cassette housing 1 will rest on the shoulders at the top of base portions 41*a* of pins 42 and 43 adjacent the opposite sides of the cutout in the bottom wall of the cassette housing and on the upper end of locating pin 39 at a single point adjacent the closed relatively long side of the cassette housing. The reel drive shafts or spindles 40*a* and 40*b* (FIG. 6) of the recording and/or reproducing apparatus are of course located relative to the locating pins 39, 42 and 43 so that, when the tape cassette T is positioned by such locating pins, the drive shafts 40*a* and 40*b* will extend into the hubs of reels 2 and 3 and be rotatably coupled with the latter.

Since the end portion 41*b* of locating pin 42 is intended to engage closely in the respective socket 44, the top wall 44*a* of such socket may be formed with a vent hole 46 (FIG. 5) through which air may enter and leave the socket to avoid any interference with the easy insertion and removal of the end portion 41*b* of pin 42.

Figure 7:
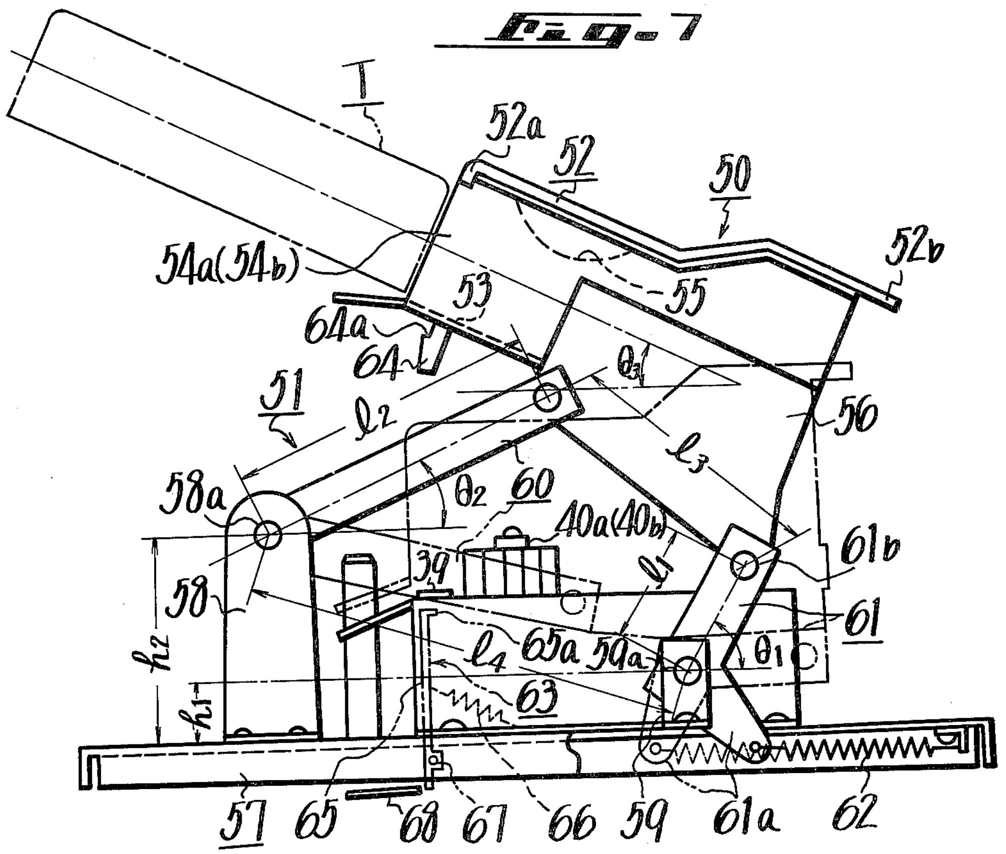
FIG. 7 is a side elevational view of a cassette loading mechanism adapted to receive a tape cassette according to this invention and being effective to dispose such tape cassette in an operative position on the recording and/or reproducing apparatus.

Referring now to FIG. 7, it will be seen that the tape cassette T may be conveniently used in connection with a magnetic tape recording and/or reproducing apparatus having a cassette loading mechanism including a holder 50 which receives the cassette in a conveniently inclined elevated position shown in full lines and is then movable downwardly to the position shown in broken lines at which the received cassette is horizontally disposed in its operative position on the previously described locating pins 39, 42 and 43 for rotatable coupling of its reels 2 and 3 with drive shafts 40*a* and 40*b* and further for proper positioning of the tape within the cassette housing in respect to the tape loading device (not shown) by which the tape may be extracted or withdrawn from the cassette housing for a recording or reproducing operation. The holder 50 is shown to be generally of box-like configuration and includes top and bottom walls 52 and 53 which are connected at their adjacent ends by opposed end walls 54*a* and 54*b* so as to open at the other opposed sides of holder 50. The holder 50 of the cassette loading mechanism shown on FIG. 7 is intended to have the tape cassette T inserted therein in the direction perpendicular to the open relatively long side of the cassette housing, for example, as on FIG. 10, and thus the distance between walls 54*a* and 54*b* is selected to be slightly larger than the larger dimension of the cassette housing and such end walls 54*a* and 54*b* are provided with the guide ridges 36*a''* and 36*b''* for entry into the widened ends 36*a* of grooves 36 when the tape cassette is inserted with lid 12 at the leading side thereof. As shown on FIG. 7, the top wall 52 of holder 50 is at a relatively small distance from bottom wall 53 at the open side of the holder through which tape cassette T is inserted, while the top wall 52 is stepped upwardly, as at 52*b*, adjacent the opposite side of holder 50 so that the top wall will not there interfere with the opening of lid 12 within the cassette holder. It will further be understood that bottom wall 53 of the cassette holder has openings (not shown) formed therein and being located to permit the upward passage therethrough, when holder 50 is in the operative position, of the reel drive shafts 40*a* and 40*b* and of the cassette locating pins 39, 42 and 43. Leaf springs 55 are provided at the underside of top wall 52 to bear downwardly on the top wall of the cassette housing and thereby hold the latter downwardly against bottom wall 53 when tape cassette T is inserted in holder 50.

The illustrated cassette loading mechanism is further shown to comprise a shifting mechanism 51 by which holder 50 may be moved between the positions shown in full and broken lines on FIG. 7. Such shifting mechanism 51 includes a cradle 56 to which holder 50 is secured, brackets 58 and 59 fixed to baseplate or chassis 57 and supporting respective shafts 58*a* and 59*a* which extend parallel to the plane of baseplate 57 and are spaced from each other by a distance $l_4$. Shaft 59*a* is disposed at a relatively small distance $h_1$ above baseplate 57, while shaft 58*a* is disposed at a relatively large distance $h_2$ above the baseplate. A pair of levers 60 of a relatively long length $l_2$ are pivotally supported, at one end, on shaft 58*a*, and the other ends of lever 60 are pivotally connected to cradle 56. A pair of levers 61 of a relatively short length $l_1$ are pivotally mounted, at one end, on the shaft 59*a* and have their other ends pivotally connected to cradle 56 at a distance $l_3$ from the pivotal connections of levers 60 to the cradle. At least one of the levers 61 has an arm 61*a* extending therefrom and connected to a tension spring 62 by which the respective lever 61 is urged in a counter-clockwise direction to the position illustrated in full lines.

Preferably, the various elements of shifting mechanism 51 are dimensioned as follows:

$l_1$ is approximately equal to 2/5 $l_2$ $l_3$ is approximately equal to 3/5 $l_4$ $h_1$ is approximately equal to 2/7 $h_2$ $\theta_1$ (that is, the angle between the center line of each lever 61 in its raised position and the horizontal) is approximately equal to 60°.

$\theta_2$ (that is, the angle between the center line of each lever 60 in its raised position and the horizontal) is approximately equal to 25°.

When the above dimentional relationships are provided, cassette holder 50 is inclined from the horizontal at a convenient angle $\theta_3$ for receiving the tape cassette T when in its raised position, and, when holder 50 is moved downwardly to its operative position illustrated in broken lines, the final downward movement of the holder is effected in a vertical direction for permitting the proper engagement of reel drive shafts 40*a* and 40*b* and of locating pins 39, 42 and 43 with the respective parts of the tape cassette.

In order to lock holder 50 in its lower operative position against the force of spring 62, the cassette loading mechanism is further shown to include a locking mechanism 63 that includes a locking pawl 64 depending from bottom wall 53 of holder 50, and a retainer 65 which is pivoted at 67 on baseplate 57 and has a locking portion 65*a* at its upper end engageable with a nose 64*a* on pawl 64 when holder 50 is in its lowered operative position. A spring 66 acts on retainer 65 to pivot the latter in the clockwise direction into engagement with pawl 64, and the lower end portion of retainer 65 is engageable by an operating rod 68 for rocking of retainer 65 in the counter-clockwise direction, that is, in the direction for releasing the pawl 64. The rod 68 may be actuable by an ejection button (not shown) when it is desired to release pawl 64 and thereby permit spring 62 to return holder 50 its elevated inclined position at which the tape cassette T is conveniently removed therefrom.

Figure 8:
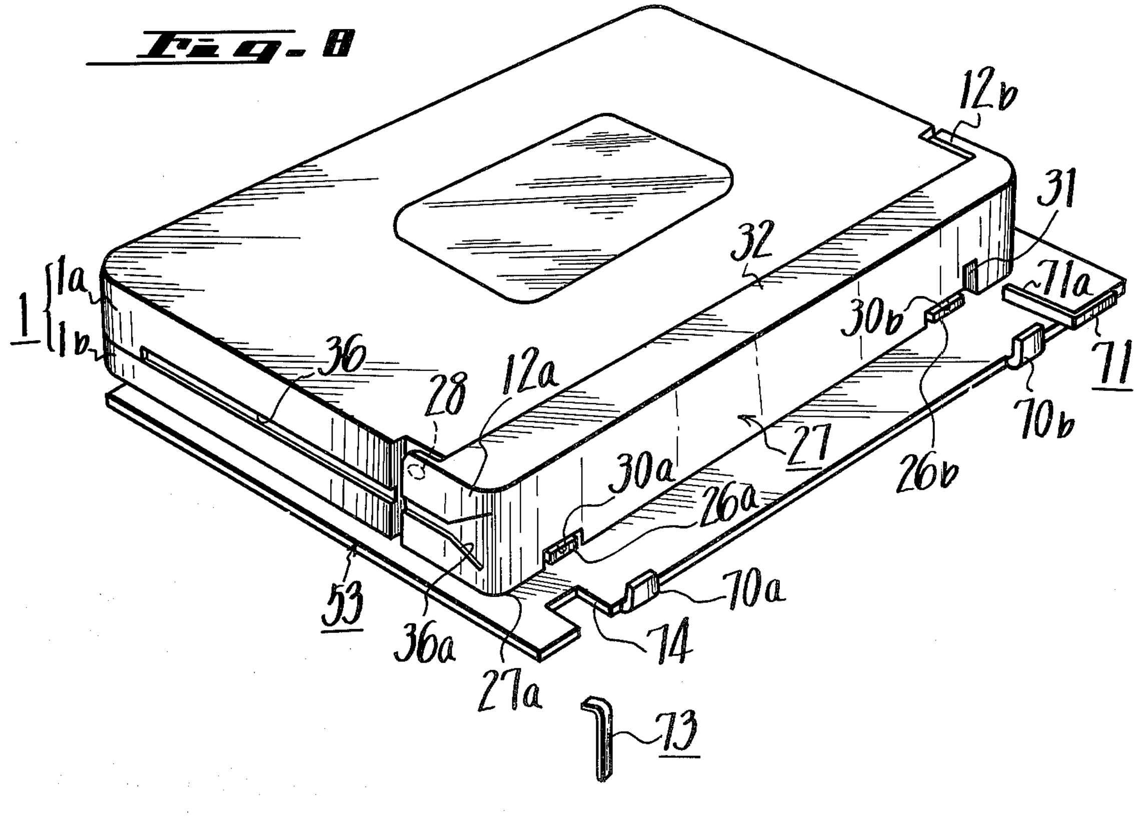
FIG. 8 is a perspective view illustrating the condition of the tape cassette according to this invention in the course of its insertion into a holder included in the cassette loading mechanism of FIG. 7.

As shown particularly on FIG. 8, bottom wall 53 of holder 50 may be provided with a pair of abutments 70*a* and 70*b* directed upwardly from the edge of bottom wall 53 remote from the open side of holder 50 at which tape cassette T is introduced. The abutments 70*a* and 70*b* are spaced apart at locations along the respective edge of bottom wall 53 that correspond to the locations of locating elements 26*a* and 26*b* on the bottom wall of cassette housing 1, and abutments 70*a* and 70*b* project above the top surface of bottom wall 53 by a distance substantially equal to the thickness of locating elements 26*a* and 26*b*. When tape cassette T is inserted into holder 50, the movement of the tape cassette in the direction of its insertion is limited by the engagement of locating elements 26*a* and 26*b* with the respective abutments 70*a* and 70*b*. Thus, the final position of cassette housing 1 relative to holder 50 is precisely determined without the possibility of error resulting from any clearance or looseness of lid 12 relative to the cassette housing. By reason of such precise determination of the position of cassette housing 1 in respect to holder 50, proper engagement of the tape cassette with reel drive shafts 40*a* and 40*b* and with locating pins 39, 42 and 43 is ensured when holder 50 is lowered to its operative position. Since abutments 70*a* and 70*b* on holder 50 are engaged only with locating elements 26*a* and 26*b* projecting through cutouts 30*a* and 30*b* in lid 12, such engagement for determining the final position of cassette housing 1 in holder 50 does not interfere with the opening of lid 12, as on FIG. 9.

An L-shaped latch releasing member 71 (FIGS. 8 and 9) which is suitably attached to the side wall 54*a* (not shown on FIGS. 8 and 9) of holder 50 or to the adjacent side or carriage 56 has an end portion 71*a* extending in the direction opposed to the direction of insertion of tape cassette T in the cassette holder and is located to extend into notch or cutout 31 of lid 12 and aperture 16*c* of cassette housing 1 as the tape cassette nears its final position in holder 50. Thus, during the final portion of the inserting movement of the tape cassette to its predetermined position in holder 50, end portion 71*a* of latch releasing member 71 acts against the oblique or beveled end surface 17*f* of the thick end portion 17*c* of latching element 17 for displacing such thick end portion 17*c* laterally away from the adjacent wall end portion 15*b'*, and thereby releasing the latching pin or projection 17*b* from the opening 23 of lid 12 so that the latter is then free to be opened.

Of course, if the tape cassette T is used with a cassette loading mechanism of the type in which the cassette is inserted in the lengthwise direction into the holder 50, for example, as illustrated on FIG. 11, a latch releasing member similar to the member 71 on FIGS. 8 and 9 is provided at the side of the holder toward which the tape cassette is moved so that, as the tape cassette nears its final position in the cassette holder, such latch releasing member extends through cutout 29 of lid 12 and aperture 16*b* of cassette housing 1 to act against the adjacent side of thick end portion 17*c* of latching element 17 for similarly releasing the latching element and freeing the lid 12 for movement to its opened position.

In either case, that is, whether the tape cassette is inserted into a cassette holder in the lengthwise direction of the cassette or at right angles thereto, the opening of lid 12 may be effected in response to the downward movement of cassette holder 50 from its raised cassette receiving position to its lowered operative position. In order to effect such opening of lid 12, the magnetic tape recording and/or reproducing apparatus may be provided with a lid opening member 73 (FIGS. 8 and 9) which extends upwardly, for example, from the baseplate 57 of FIG. 7, and is fixedly positioned so that, as holder 50 is moved downwardly to its operative position, the bent upper end of member 73 will engage, and push upwardly against, the lower edge of front portion 27 of lid 12 adjacent the end of such front portion 27 from which ear 12*a* extends. As shown particularly on FIG. 9, bottom wall 53 of holder 50 is formed with a cutout 74 adjacent abutment 26*a* so as to substantially register with the corner recess 80 of cassette housing 1. Such cutout 74 and corner recess 80 are provided to receive lid opening member 73 as the holder 50 and tape cassette T move forwardly in the course of the downward movement of holder 50 from its raised inclined position to its lowered operative position parallel to baseplate 57. By reason of the engagement of member 73 with the lower edge of front portion 27 of lid 12, the latter is pivoted to its open position during the final movement of holder 50 to its lowered operative position.

It will be apparent from the foregoing that, when holder 50 reaches its lowered operative position, the cassette housing accurately located in the cassette holder is, accordingly, accurately positioned for engagement by the locating pins 39, 42 and 43 and the lid 12 of the tape cassette is fully opened so that the tape 11 can be withdrawn or extracted from the cassette housing, as by a conventional tape loading device (not shown). When cassette housing 1 is positioned by locating pins 39, 42 and 43, reel drive shafts 40*a* and 40*b* engaging within the hubs of reels 2 and 3 preferably act against the end walls 4*b* and 4*b'* of such reels so as to raise the latter away from frictional material on the bottom wall of cassette housing 1 against the force of springs 8 and 8', whereby to make the tape supply and take-up reels freely rotatable.

It will be further apparent that, in the tape cassette T, guiding means, for example, the previously described grooves 36 and groove 36', are effective to guide the cassette into a holder either in the direction perpendicular to, or the direction parallel to, the longitudinal axis of the cassette, and that the latching element 17 for locking lid 12 in its closed position is arranged for release during the insertion of the tape cassette into a holder in either of the described directions.

It is to be noted that the grooves 36 and 36' on cassette housing 1 may be replaced by similarly positioned elongated ridges, in which case, the ridges 36*a''* and 36*b''* (FIG. 10) and the ridge 36*b'* (FIG. 11) provided in the cassette holder 50 are replaced by similarly positioned grooves.

In accordance with this invention, a tape cassette of the type described above has a brake member or device provided in the cassette housing to prevent the supply and take-up reels from being rotated freely when the tape cassette is not used and the brake member is operated in connection with the opening and closing operation of the lid. More specifically when the lid is in its closed position, the reels are prevented from being rotated by the brake member, but, when the lid is in its open position, the brake member is released so as to make the reels rotatable freely.

An embodiment of this invention will be now described in detail with reference to FIGS. 13 to 17.

Figure 13:
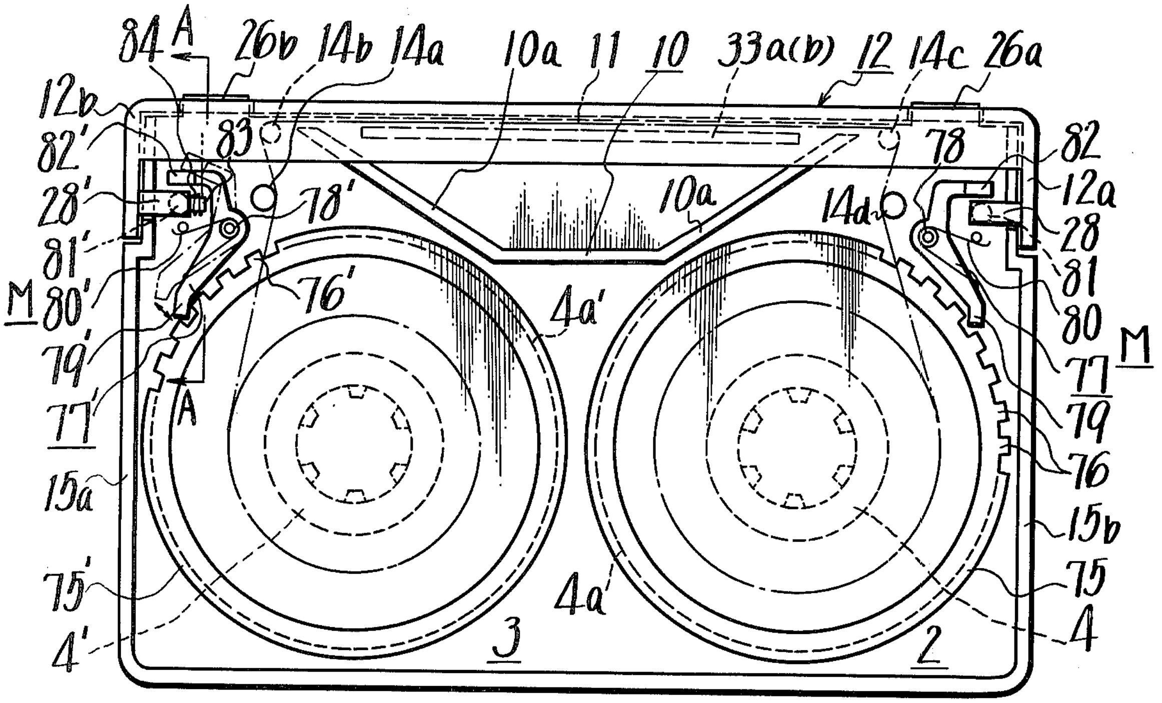
FIG. 13 is a top plan view of an embodiment of the tape cassette in accordance with this invention, but with the top wall of the cassette housing being removed.

As shown, particularly on FIGS. 13 and 14, the peripheral edges 75 and 75' of lower flanges 4*a* and 4*a'* of supply and take-up reels 2 and 3 are formed with circumferentially spaced apart notches or teeth 76 and 76'; respectively. The brake members or devices M include or brake levers 77 and 77' which are pivotally mounted on pins 78 and 78', respectively, extended from the bottom wall of cassette housing 1. The latching or brake levers 77 and 77' are provided at their one ends, with protrusions 79 and 79'. Springs 80 and 80' are provided so that the brake lever 77 is biased in the clockwise direction while the brake lever 77' is biased in the counterclockwise direction. As a result, the protrusions 79 and 79' are urged into the notches defined between teeth 76 and 76' to formed on peripheral edges 75 and 75' of lower flanges 4*a* and 4*a'*, respectively. As previously described, the pins 28 and 28' are provided, for example, formed integral with ears 12*a* and 12*b*, at the inside of lid 12 and are rotatably supported in recesses or apertures of wall end portions 15*a'* and 15*b'*, respectively. Thus, lid 12 is pivotally mounted on cassette housing 1 to be rotatable between its closed position (FIG. 8) and open position (FIG. 9).

With reference to FIG. 17, the manner in which the aperture for receiving pins 28 and 28' are preferably provided by upper and lower housing sections 1*a* and 1*b* will be now described. Front portions 15*a'* and 15*b'* of peripheral walls 15*a* and 15*b* of upper section 1*a* are each formed with an L-shaped recess 86 and a projection 87 is formed on each of the front portions 15*a'* and 15*b'* of peripheral walls 15*a* and 15*b* of lower section 1*b* so as to be received in the respective L-shaped recess 86. At the corresponding corners of each recess 86 and projection 87, there are provided symmetrical radii R and the space formed by radii R defines an aperture 88 in which the respective pin 28 or 28' is journalled. The top wall of upper section 1*a* is downwardly stepped or offset in front of apertures 88 to form a bent portion 89 which may be arranged at the inside of top portion 32 of lid 12 when cassette housing 1 is assembled and lid 12 is in its closed position.

The manner in which lid 12 may be assembled in respect to upper section 1a will now be described with reference to FIG. 16. A coiled spring 84 is first mounted on each of pins 28 and 28' of lid 12. Then, bent portion 89 of upper section 1*a* is inserted into the inside of top portion 32. At this time, a free end 85 of coiled spring 84 is positioned in an elongated groove 90 of bent portion 89. Accordingly, pins 28 and 28' are biased by coiled spring 84 to be urged against the corners of recesses 86 provided in upper section 1*a* at the front wall portions 15*a'*and 15*b'*.

Figure 16:
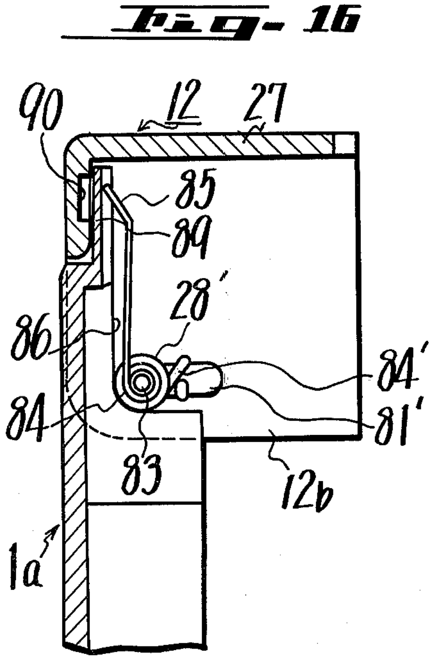
FIG. 16 is an enlarged sectional view taken along the line A—A on FIG. 13, but with the lower section of the cassette housing being removed.

It should be noted that, in the state shown in FIG. 16, upper section 1*a* and lid 12 are temporarily assembled by the spring force of each coiled spring 84. Thus, by only inserting bent portion 89 of upper section 1*a* into the inside of top portion 32 of lid 12, both members are temporarily assembled. Then, the temporarily assembled lid 12 and upper housing section 1*a* can be subjected to the next assembly step in which housing sections 1*a* and 1*b* are joined to each other.

Accordingly, a tape cassette such as shown in FIG. 1 can be assembled by mounting various parts on the lower section 1*b* at predetermined positions and then attaching the upper section 1*a*, with the lid 12 temporarily assembled therewith, to lower section 1*b*.

Figure 15:
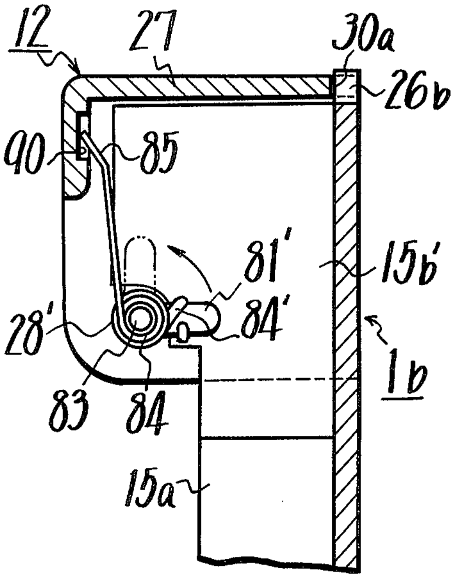
FIG. 15 is an enlarged sectional view taken along the line A—A on FIG. 13, but with upper section of the cassette housing being removed.

In accordance with the present invention, pins 28 and 28' have, at their free ends, integral projections 81 and 81', respectively, and such projections 81 and 81' are directed toward the bottom wall when the lid is in its closed position, as shown in FIGS. 14 and 15. When the lid is in its closed position, the end portions of brake levers 77 and 77' remote from protrusions 79 and 79' extend in the spaces between projections 81 and 81' and front portion 27 of lid 12, respectively, as shown in FIGS. 13 and 14. The above end portions of brake levers 77 and 77' are bent to have L-shaped configurations and the bent portions are provided, at their free ends, with upwardly directed projections 82 and 82', respectively. Accordingly, when lid 12 is rotated from its closed position to its open position, projection 82 and 82' of brake levers 77 and 77' are displaced by projections 81 and 81', respectively, with the result that brake levers 77 and 77' are rotated in counterclockwise and clockwise directions, respectively. When lid 12 has attained its open position, brake lever 77' is displaced to the position shown in broken lines on FIG. 13, and hence protrusion 79' of brake lever 77' disengages fully from the notch between teeth 76' to make the take-up reel 3 freely rotatable. The other reel or supply reel 2 is similarly made freely rotatable by the displacement of brake lever 77. Further, the pin 28' is provided, at its free end, with an extension 83 around which there is disposed the coiled spring 84. The end portion 84' of coiled spring 84 remote from end 85 engages with projection 81'. Since the end 85 of spring 84 is urged against the top wall of upper section 1*a*, as shown in FIG. 16. The lid 12 is normally biased by coiled spring 84 to its closed position.

In the above embodiment, the brake members or devices are constituted by the brake levers 77 and 77' and the plurality of notches formed in the peripheral edges of reels 2 and 3 to be engaged by the protrusions of the brake levers to stop the rotation of the reels. However, there is no need that the brake devices for preventing the rotation of the reels be limited to that mentioned above, and various other brake devices can be employed.

Figure 18:
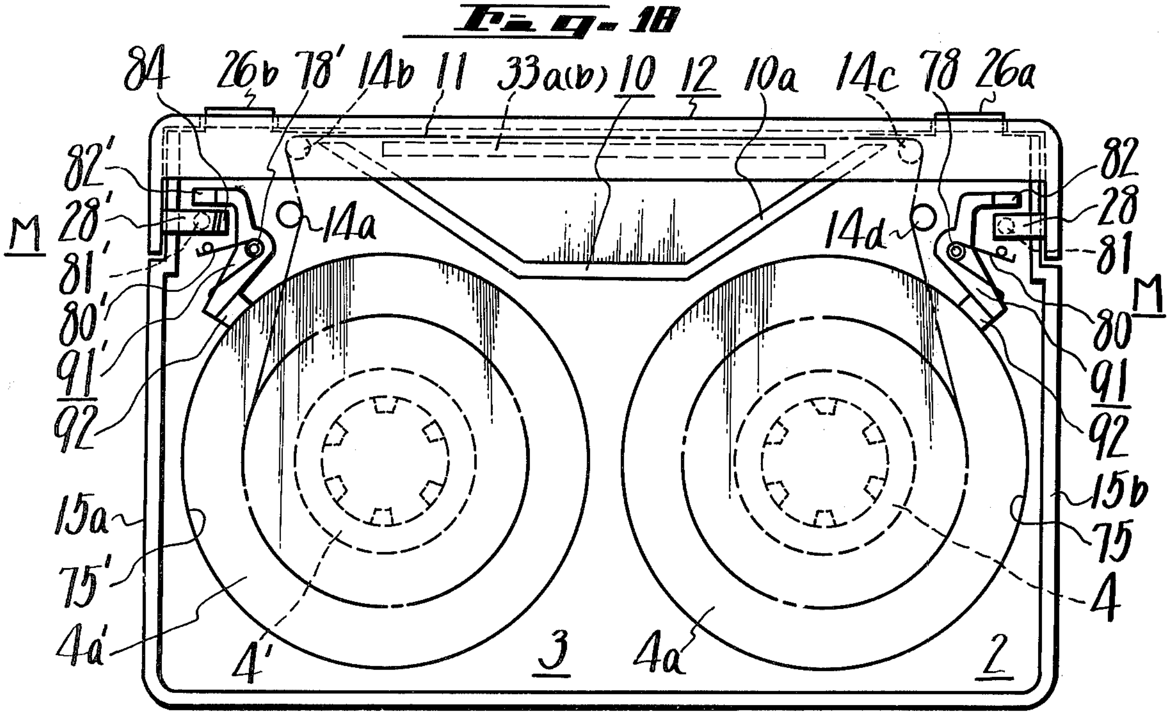
FIG. 18 is a top plan view of another embodiment of the tape cassette in accordance with this invention, but with the top wall of the cassette housing being removed.

Other brake devices that may be employed according to this invention will now be described with reference to FIG. 18 is which parts corresponding to those described above with reference to FIGS. 13 to 17 are identified by the same reference numerals. In the embodiment of FIG. 18, brake levers 91 and 91' are provided in place of levers 77 and 77' and brake shoes 92 and 92' are attached to ends of brake levers 91 and 91' instead of protrusions 79 and 79', respectively. In this embodiment, there are no notches or teeth 76 and 76' formed on the peripheral edges 75 and 75' of lower flanges 4*a* and 4*a'* of supply and take-up reels 2 and 3, so that the brake shoes 92 and 92' are adapted to frictionally the peripheral edges 75 and 75'. Apart from the foregoing, the embodiment shown in FIG. 18 is substantially the same as that illustrated by FIGS. 13 to 17.

As is apparent from FIGS. 13 and 18, when lid 12 is in its closed position and supply and take-up reels 2 and 3 are urged to rotate in the directions to unwind tape 11 therefrom, protrusions 79, 79', (FIG. 13) or brake shoes 92, 92' (FIG. 18) are urged strongly against teeth 76 and 76' of peripheral edges 75, 75' of reel flanges *4a*, *4a'* or against peripheral edges 75, 75', while, in the case when reels 2 and 3 rotate in the directions to take up the tape on the reels, the urging force of the protrusions or brake shoes against the reels is not increased. As a result, even if the lid is in its closed position, the reels can be rotated relatively easily in the directions to take up any slack in the tape stretched between the supply and take-up reels.

Further, in the cassette according to the invention the brake device is operated through the lid, so that there is no need to provide an additional aperture in the cassette housing for independently operating the brake device therethrough and consequently the entry of dust or the like into the cassette housing through the aperture is avoided.

Further, the cassette according to the invention may be inserted into the holder in the direction perpendicular to or parallel to the longitudinal axis of the cassette without affecting the operation of the brake device.

The present invention is not limited to the above described embodiments, but, for example, the brake device may be formed so that it acts on the upper flange or on both the upper and lower flanges of the reels.

Further, the regions at which the brake device acts on the reels is not limited to the peripheral edges thereof, for example, the brake device can act on the radially extending faces of the reel flanges.

Although illustrative embodiments of the invention have been described in detail herein with reference to the accompanying drawings, it is to be understood that the invention is not limited to those precise embodiments, and that various changes and modifications, some of which are mentioned above, can be effected therein without departing from the scope and spirit of the invention as defined in the appended claims.

I claim as my invention

1. A tape cassette comprising:

a. a housing of generally rectangular configuration containing at least one reel for a supply of tape and having top and bottom walls and a peripheral wall extending between said top and bottom walls along the sides of the latter so as to leave an opening along at least a side of the housing through which the tape can be exposed;

b. a lid pivoted on said housing for movement between a closed position covering said opening and an opened position exposing said opening; and c. means responsive to the position of said lid for preventing rotation of said reel when said lid is in the closed position and for permitting rotation of said reel when said lid is in the opened position.

2. A tape cassette as defined in claim 1; wherein said reel includes a flange, and said means for preventing rotation of said reel includes a lever pivotally mounted in said housing, said lever having a first end portion extending into the influence of the movement of said lid and a second opposite end portion having a protrusion adapted to be engaged with said flange, and spring means normally biasing said lever in a first direction to engage said protrusion with said flange thereby to prevent rotation of said reel, whereby when said lid is moved to said opened position for exposing said opening it engages said first end portion of said lever to pivot the lever against the bias of said spring means, thereby to free said reel for rotation.

3. A tape cassette as defined in claim 2; wherein said flange has a plurality of notches formed in the peripheral edge thereof, and said protrusion of said second end portion is engageable in said notches in response to the biasing of said lever in said first direction by said spring means.

4. A tape cassette as defined in claim 2; wherein said lid has a pin by which it is pivotally mounted on said housing, and said pin has means thereon engageable with said first end portion of the lever for pivoting the latter against said bias of the spring means when said lid is moved from said closed position to said opened position.

5. A tape cassette as defined in claim 4; wherein said housing includes upper and lower sections having mating surfaces along which said sections are joined together, and said mating surfaces of the upper and lower sections are formed to define a bearing for said pin.

6. A tape cassette comprising:

a. a housing of generally rectangular configuration containing two reels having a supply of tape wound thereon, said housing including top and bottom walls and a peripheral wall extending between said top and bottom walls along the sides of the latter so as to leave an opening along at least a side of the housing through which the tape can be exposed;

b. a lid mounted on said housing for movement between a closed position covering said opening and an opened position exposing said opening; and c. means responsive to the position of said lid for preventing rotation of said reels when said lid is in said closed position rotation for permitting rotatin of said reels when said lid is in said opened position.

7. A tape cassette as defined in claim 6; wherein said means for preventing rotation of said reels includes two braking means respectively associated with said two reels, and said lid has brake releasing means thereon engaging said two braking means for releasing the latter upon said movement of the lid from said closed position to said opened position.

* * * * *